United States Patent [19]

Tondello et al.

[11] 4,254,335

[45] Mar. 3, 1981

[54] SPECTROGRAPH-MONOCHROMATOR OF GRAZING INCIDENCE TYPE

[75] Inventors: Giuseppe Tondello, Padua; Andrea M. Malvezzi, Milan, both of Italy

[73] Assignee: C.I.S.E. Centro Informazioni Studi e Esperienze S.p.A., Italy

[21] Appl. No.: 947,302

[22] Filed: Sep. 29, 1978

[30] Foreign Application Priority Data

Oct. 19, 1977 [IT] Italy .................. 28786 A/77

[51] Int. Cl.³ .................. G01N 23/20; G21K 1/00; G21K 7/00
[52] U.S. Cl. .................. 250/277 R; 250/272
[58] Field of Search ........... 250/272, 273, 274, 277 R, 250/278, 279, 280, 277 CH

[56] References Cited

U.S. PATENT DOCUMENTS

| | | | |
|---|---|---|---|
| 3,486,021 | 12/1969 | Honme et al. | 250/278 |
| 3,566,111 | 2/1971 | Harm | 250/278 |
| 3,906,225 | 9/1975 | Goernet et al. | 250/278 |

*Primary Examiner*—Alfred E. Smith
*Assistant Examiner*—Thomas P. O'Hare
*Attorney, Agent, or Firm*—Karl W. Flocks

[57] ABSTRACT

This invention relates to a spectrograph-monochromator of grazing incidence type which is particularly but not exclusively designed for examining soft x-ray and ultraviolet radiation. the spectrograph-monochromator according to the invention comprises an inlet slit, a reflecting diffraction grating and a detector comprising a photographic plate for spectrographic recording or, alternatively, an outlet slit for selecting a single monochromatic component, the improvement being that the inlet slit is disposed in a fixed position relative to a base plate, provided with an openable cover and said grating and said detector are disposed longitudinally displaceable on a curved guide, which represents a portion of a Rouland circle and is rotatable about an axis coinciding with that of said inlet slit.

7 Claims, 7 Drawing Figures

SPECTROGRAPH-MONOCHROMATOR OF GRAZING INCIDENCE TYPE

This invention relates to a spectrograph-monochromator of grazing incidence type, which is particularly but not exclusively designed for examining soft X-ray and ultraviolet radiation.

The examination of a radiation (infrared, visible, ultraviolet, X) emitted by a source consists basically of two different operations:

(a) Measuring the radiation spectrum. This consists of separating, by dispersion, the monochromatic components of the emitted radiation (for example the various colours in the case of visible radiation).

(b) Measuring the intensity of the radiation emitted in each monochromatic component, or in a predetermined spectral band. This can be effected either photographically, and thus without time resolution, or photoelectrically by measuring moment for moment the intensity emitted in a spectral band fixed by the source.

The instruments used for these measuring operations are essentially two in number, namely spectrographs and monochromators, which are sometimes combined into a single instrument able to operate in both modes.

Spectrographs are instruments which simultaneously measure the intensities relative to a wide spectral band (for example the entire visible and part of the ultraviolet bands). They usually use photographic plates as detectors.

Monochromators are instruments which select a single spectral component (usually as small as possible) of the incident radiation, which can then be detected for example by electronic photodetectors.

Both instruments are characterised by the presence of three fundamental elements:

(a) inlet slit. The purpose of this is to suitably collimate the radiation from the source.

(b) dispersing element. This separates along known directions the various monochromatic components contained in the incident radiation beam arriving from the slit. It can be of the transmission type (for example a prism), or of the reflection type (for example a diffraction grating).

(c) focal plane. This is a surface, for example cylindrical, in which the various monochromatic components are separately focused in previously known positions. Essentially, as many images of the inlet slit as there are monochromatic components present in the incident radiation are focused in predetermined positions on the focal plane.

In general, spectrographs and monochromators differ from each other by the spectral band in which they can be used (infrared, visible, ultraviolet, vacuum ultraviolet, soft X-rays, X-rays, Y-rays). As stated, the spectrograph-monochromator according to the present invention is designed to examine ultraviolet and soft X-ray radiation. This corresponds to a wavelength range λ of about 5 to 900 Å (the visible spectrum extends from 3500 to 7000 Å). In this spectral range, radiation is absorbed not only by the common transparent materials, but also by air, and thus both the instrument and the sources must be evacuated of air in order to enable the radiation to be transmitted. The vacua which have to be attained are of the order of $10^{-4}$ – $10^{-6}$ Torr (from 1/100000 to 1/100000000 atmospheres). In this spectral range, radiation is strongly attenuated when it strikes reflecting surfaces such as mirrors, except when the angle of incidence does not exceed the so-called critical angle. As such angles are very close to 90° (typically of the order of 80°), the angle between the direction of the radiation and the reflecting surface, complementary to the angle of incidence, must then be very small (typically 5° to 0.5°), i.e. so-called "grazing incidence" must be obtained. The reflectivity is even then of the order of 10-20%.

Spectrographs and monochromators for the spectral region of 5–900 Å must therefore satisfy the following general characteristics.

(a) Vacuum-tight. This means that the instrument must be provided with a rigid sealed container.

(b) Disperser element of reflection type.

(c) Minimum number of reflections for the inlet beam.

In this range of wavelengths, the optical arrangement of a spectrograph or monochromator is constituted by the so-called "Rowland circle". In this arrangement, a spherical reflecting diffraction grating is used. In this manner, with only one reflection, the individual monochromatic components are dispersed and simultaneously focused on the focal plane, so minimising losses in the light intensity due to multiple reflection. In order to utilise these properties of the spherical grating, the inlet slit, the grating and the focal plane lie on a cylinder, the diameter of which is equal to the radius of curvature of the grating. Thus images of the slit corresponding to the various spectral components emitted by the source are obtained on the focal plane. If a curved photographic plate is positioned at the focal plane, the instrument functions as a spectrograph, simultaneously recording a wide spectral range. If on the other hand a thin slit is moved along the focal plane so as to select a single monochromatic component, the instrument functions as a monochromator.

All the instruments which operate in the vacuum ultraviolet and soft X-ray range are characterised by this type of optical arrangement, which however also gives rise to certain important problems. One of these is that this type of arrangement requires very high accuracy in its construction. The various optical components in the Rowland circle must in fact be aligned generally to tolerances of less than 5 μm, otherwise the performance of the instrument falls off greatly. Another is that it is not easy, if not impossible, to continuously vary the angle of incidence at which the radiation collimated by the inlet slit strikes the grating, as in fact would be important in order to raise the efficiency of the instrument in any particular spectral band. Further problems are represented by bulk, mechanical complexity, cost etc.

The object of the present invention is to provide a spectrograph-monochromator (i.e. an instrument of double use) of grazing incidence type, which represents a suitable solution to the aforesaid problems, and in particular enables the angle of incidence to be continuously varied, with the optical components correctly maintained on the Rowland circle.

This object is attained according to the invention, by a spectrograph-monochromator comprising an inlet slit, a reflecting diffraction grating and a detector comprising a photographic plate for spectrographic recording, or alternatively an outlet slit for selecting a single monochromatic component, wherein said inlet slit is disposed in a fixed position relative to a base plate provided with an openable cover, and said grating and said detector are disposed longitudinally displaceable on a single curved guide representing a portion of a Rowland circle, said guide being pivoted on said base plate so that it is rotatable about an axis coinciding with that of said inlet slit.

The present invention offers many advantages. The main advantage is the fact that as the grating and detector (photographic plate if the instrument is used as a spectrograph, outlet slit if the instrument is used as a monochromator) are disposed in a variable position on a curved guide which forms part of a Rowland circle and is rotatable about the axis of the inlet slit, which in its turn is fixed, it is possible to continuously vary the angle of incidence by gradually varying the position of the grating and detector along the guide, at the same time partially compensating the displacement of the grating by suitably rotating the guide about the axis of the inlet slit. Perfect alignment between the inlet slit, grating and detector is ensured at all times by the fixed position of the inlet slit and the constant arrangement of the grating and detector along the Rowland circle. In addition to the said characteristic arrangement of the grating and detector, there is also the related facility of replacing the photographic plate by the outlet slit (possibly by simply moving the former to the end of the guide) and vice versa, for using the instrument as a spectrograph or alternatively as a monochromator. Again in this case, the detector is always precisely aligned with the other optical components of the instrument. The fixed position of the inlet slit is very important not only for the aforesaid reasons but also for arranging and connecting the light source relative to the instrument. In this respect, this fixed position enables the direction of the incident radiation beam to be fixed in space, the result of this being to fix the light source relative to the instrument and thus provide an advantageous fixed connection between the instrument and the source. A further important aspect is that all the optical components of the instrument are connected (directly or indirectly) to the base plate, without involving the cover. This gives easy access to the optical components from all sides of the instrument and, even more important, allows the cover to be constructed relatively lightly, the cover thus being inevitably subject to deformation when the space between the plate and cover is placed under vacuum as usual, but without this deformation interfering with the alignment of the optical system. Finally, the extreme mechanical simplicity of the instrument according to the invention should be noted, this also resulting in very small overall size, as will be seen hereinafter.

These and further characteristics of the present invention will be apparent from the detailed description given hereinafter of one possible embodiment shown by way of non-limiting example in the accompanying drawings, in which.

Figure 1:
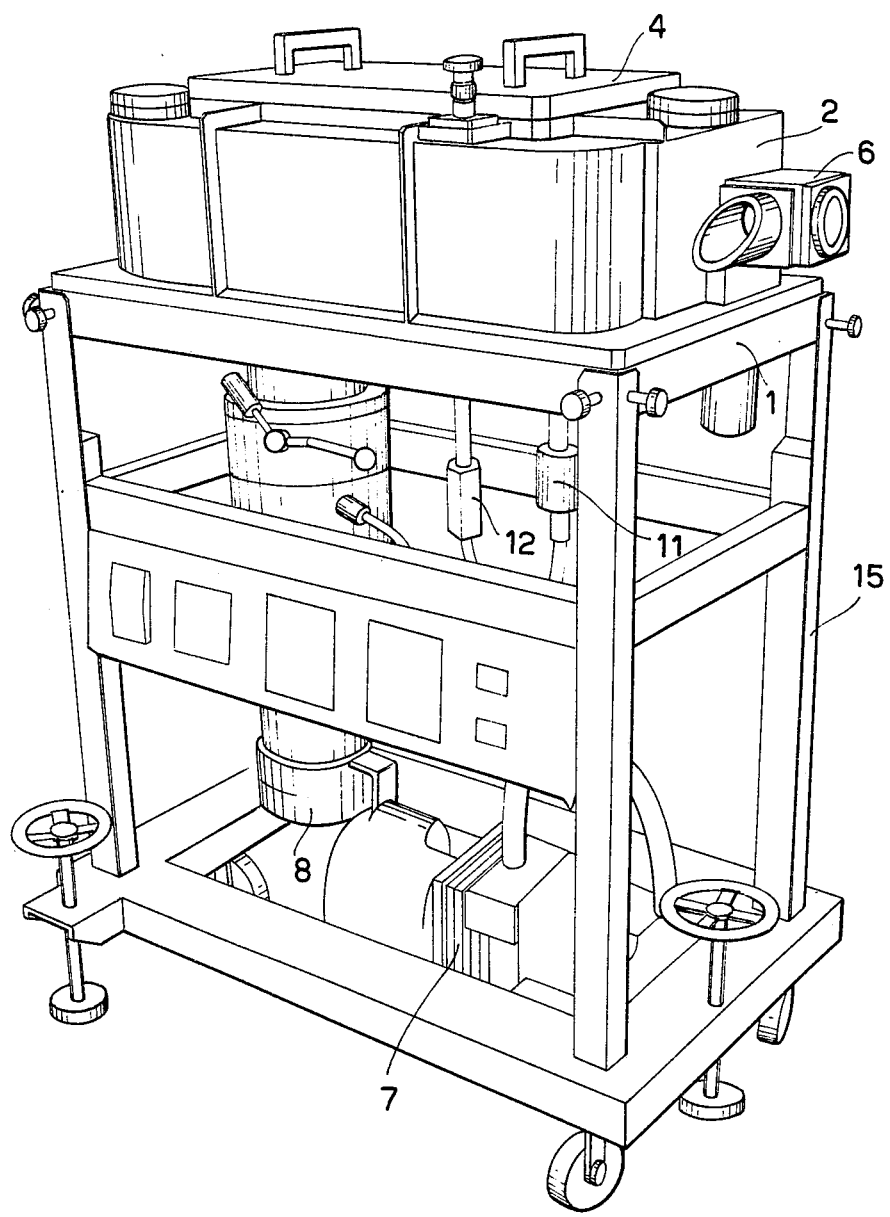
FIG. 1 is a diagrammatic overall perspective view of an instrument according to the invention, which can be used either as a spectrograph or as a monochromator.
Figure 2:
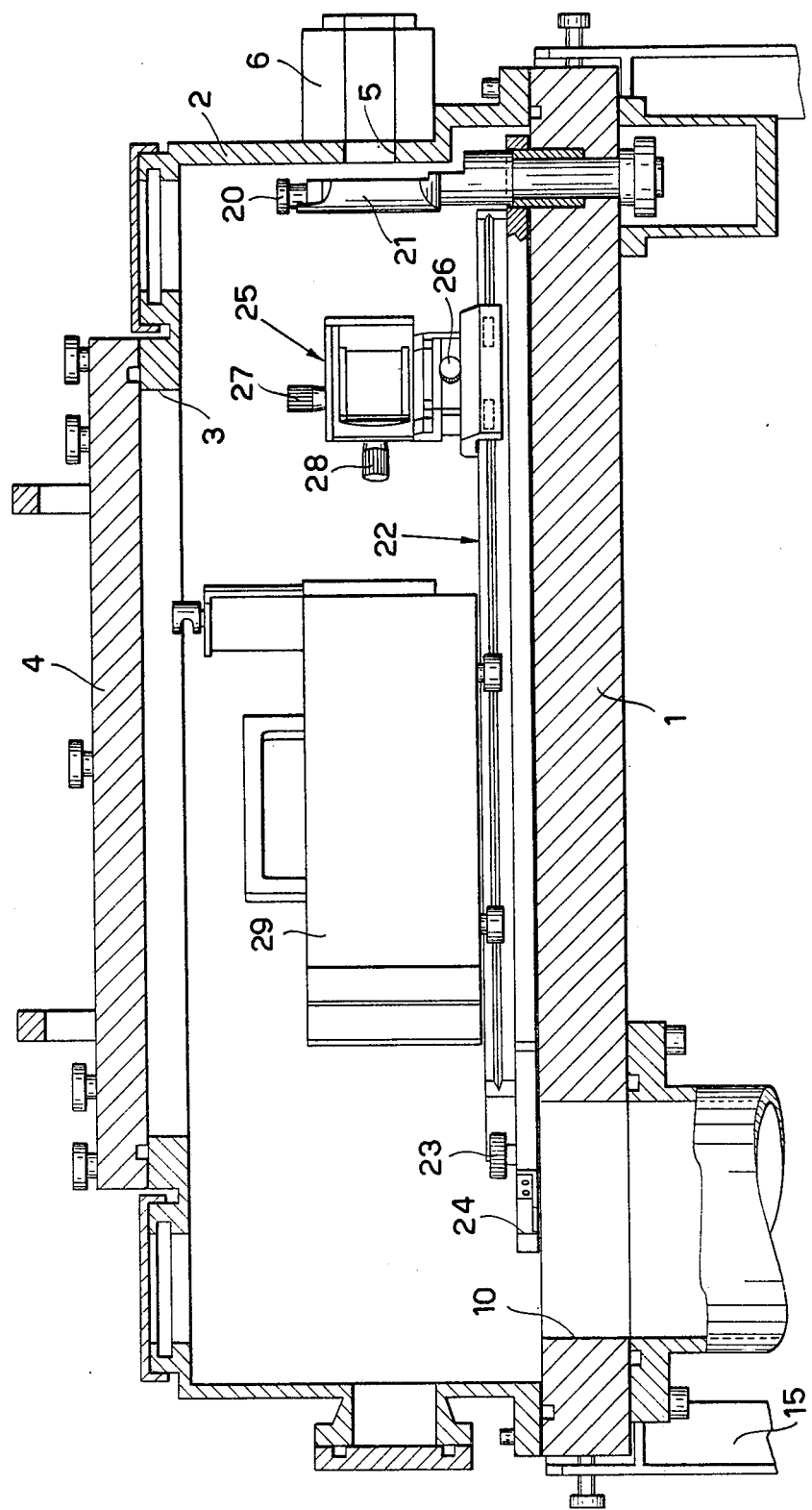
FIG. 2 is a partly sectional view, on a vertical plane, of the upper part of the instrument, including the base plate, the optical assembly and the closure cover, when the instrument is used as a spectrograph.
Figure 3:
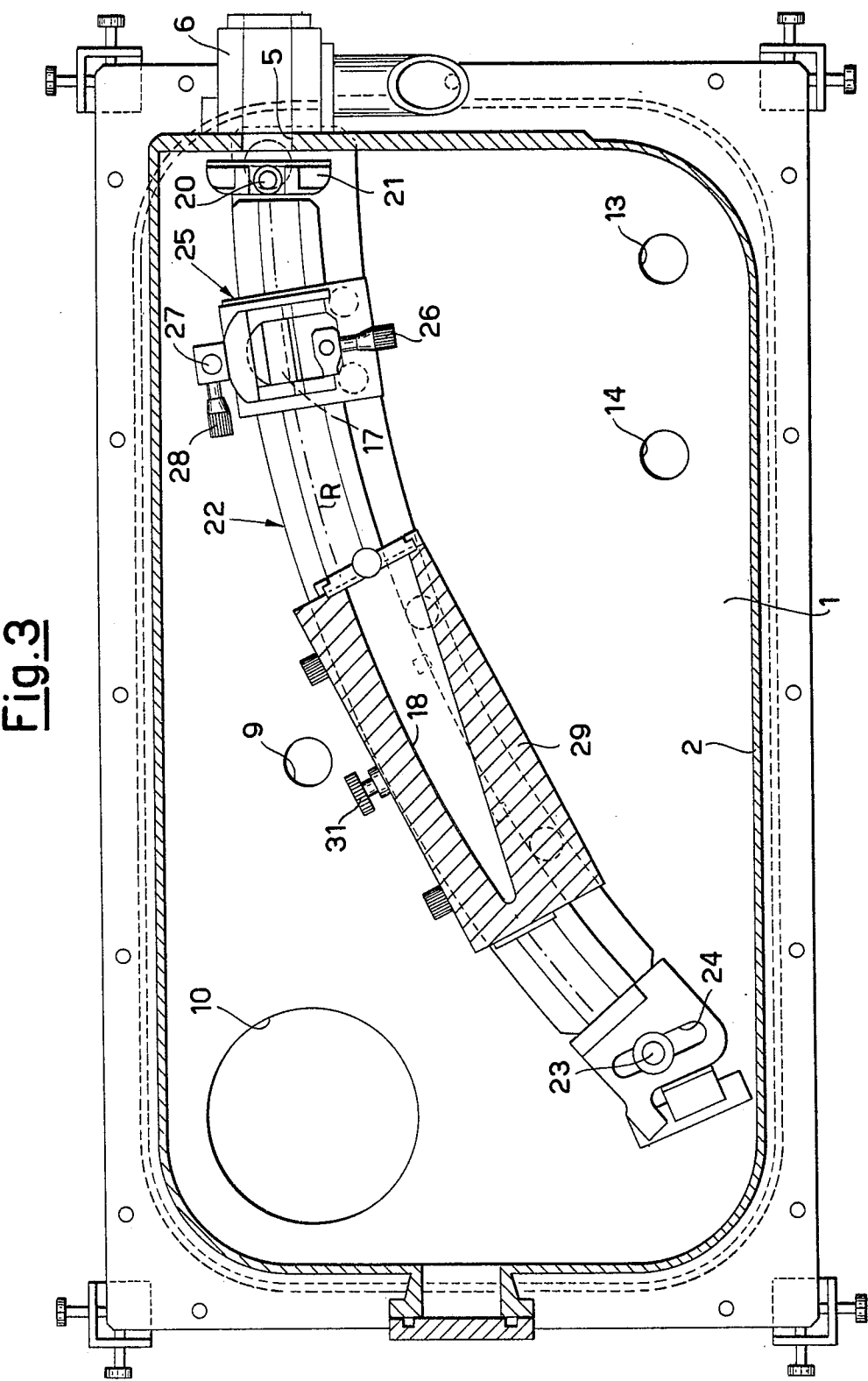
FIG. 3 is a plan view from above of the same upper part of the instrument, when used as a spectrograph.

As can be seen from the drawings, and in particular FIGS. 1 and 2, the instrument shown by way of example has its optical system contained in a space kept under vacuum and lying between a base plate 1 and an openable cover 2 provided upperly with an opening 3 closed by a removable door 4. The cover 2 is also provided with a lateral hole 5 for entry of the radiation emitted by a suitable light source optically and mechanically connected to the instrument by a fixed connector 6. The vacuum in the said space is produced by two pumps 7 and 8, one being of rotary type for creating an initial pre-vacuum, and the other of diffusion type for subsequently attaining the desired vacuum level, and which communicate with said space through respective holes 9 and 10 (FIG. 3) which pass through the base plate 1. The vacuum level is measured by two vacuum gauges 11 and 12 (with different measuring ranges), which are connected below the plate 1 at two further holes 13 and 14 therein (FIG. 3). The hole 14 is also used for passage of electric cables controlling the optical system. The entire pumping and vacuum measurement system, together with a suitable electrical control and measuring system, are contained in a movable trolley 15 (FIG. 1), which also supports the base plate 1 and the items lying thereon. Thus an instrument is produced which is both movable and of very small overall size.

Figure 4:
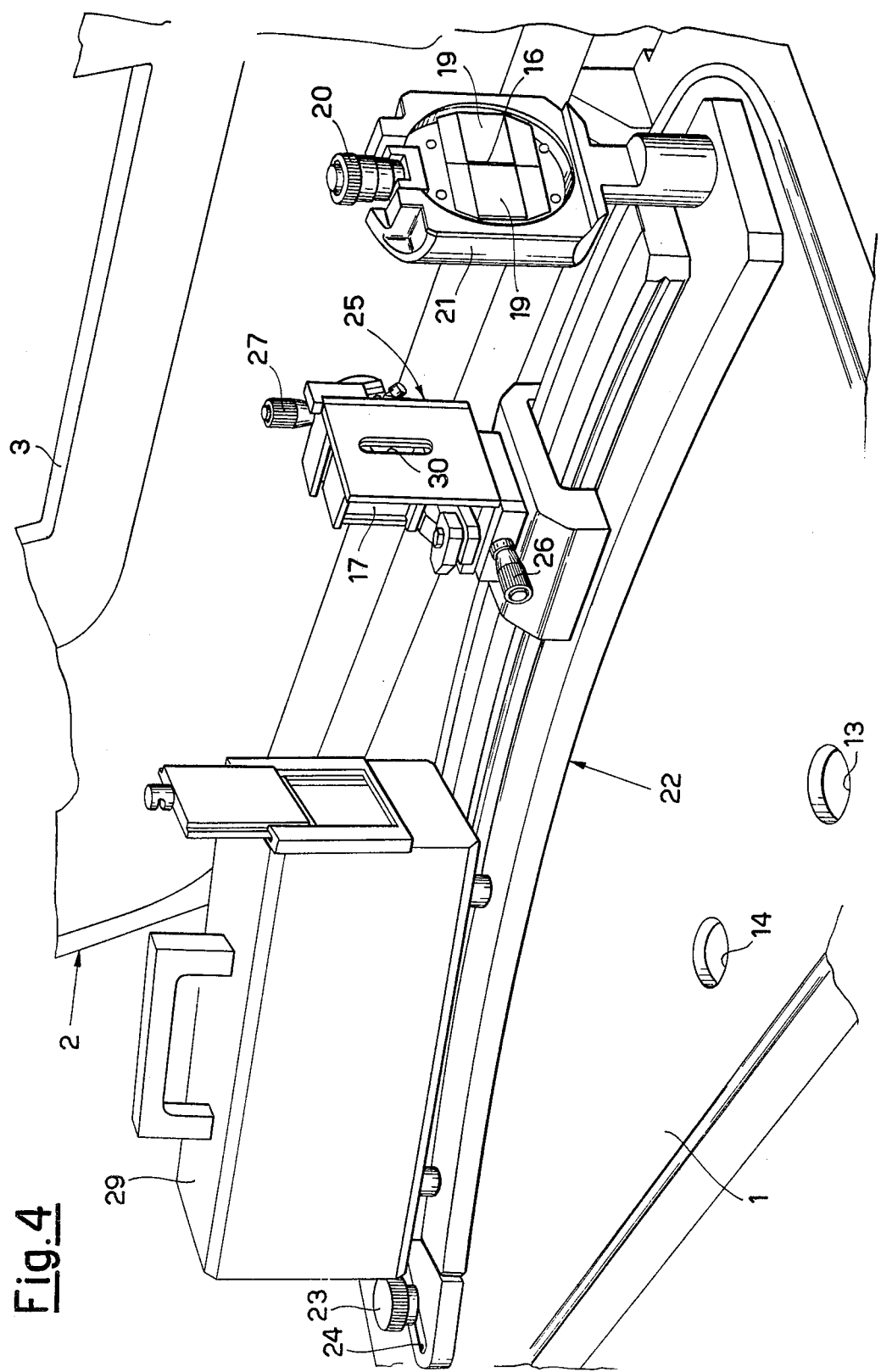
FIG. 4 is a perspective view, with the cover raised, of the optical assembly for operation as a spectrograph.

Although very similar, the optical system of the instrument obviously depends on the use to which the instrument is put. FIGS. 2, 3 and 4 show the instrument when used as a spectrograph, i.e. where the instrument is able to simultaneously record the intensities relative to a certain spectral band. For this use, the optical system of the instrument comprises an inlet slit 16, a reflecting diffraction grating 17 and detection means constituted in this case by a photographic plate 18.

As shown in FIG. 4, the inlet slit 16 is defined between two plates 19 which are mounted spaced apart by a distance which is adjustable (by means of a panel 20) within a frame 21 disposed in a fixed position on the base plate 1 in front of the inlet hole 5 for the radiation to be examined (FIGS. 2 and 3).

A curved guide 22 lying on the base plate 1 is pivoted thereto about an axis coinciding with the axis of the inlet slit 16, and can be locked in a variable angular position by means of a clamp 23 which cooperates with a terminal slot 24 in the guide (FIGS. 3 and 4). Said guide defines a portion of a Rowland circle (indicated diagrammatically by the line R in FIG. 3), in which the inlet slit 16 is disposed in a fixed manner, as stated heretofore.

A frame 25 is disposed on the curved guide 22 in a position which can be varied longitudinally by sliding (and locked by means of a clamp, not shown), and holds the diffraction grating 17 in an adjustable manner (by means of knobs 26, 27 and 28). The diffraction grating is constituted by a parallelepiped member with one face disposed substantially on the line R of the Rowland circle in such a manner that the radiation passed by the inlet slit 16 is received thereby at a high angle of incidence and thus reflected with minimum losses. An aperture 30 is disposed in front of the grating 17 to obtain correct incidence of the radiation on the grating.

A box 29 containing the photographic detector plate 18, disposed on the line R of the Rowland circle, is disposed on the curved guide 22 ahead of the grating support frame 25 in a position which is axially adjustable (and lockable by means of a clamp 31).

Figure 7:
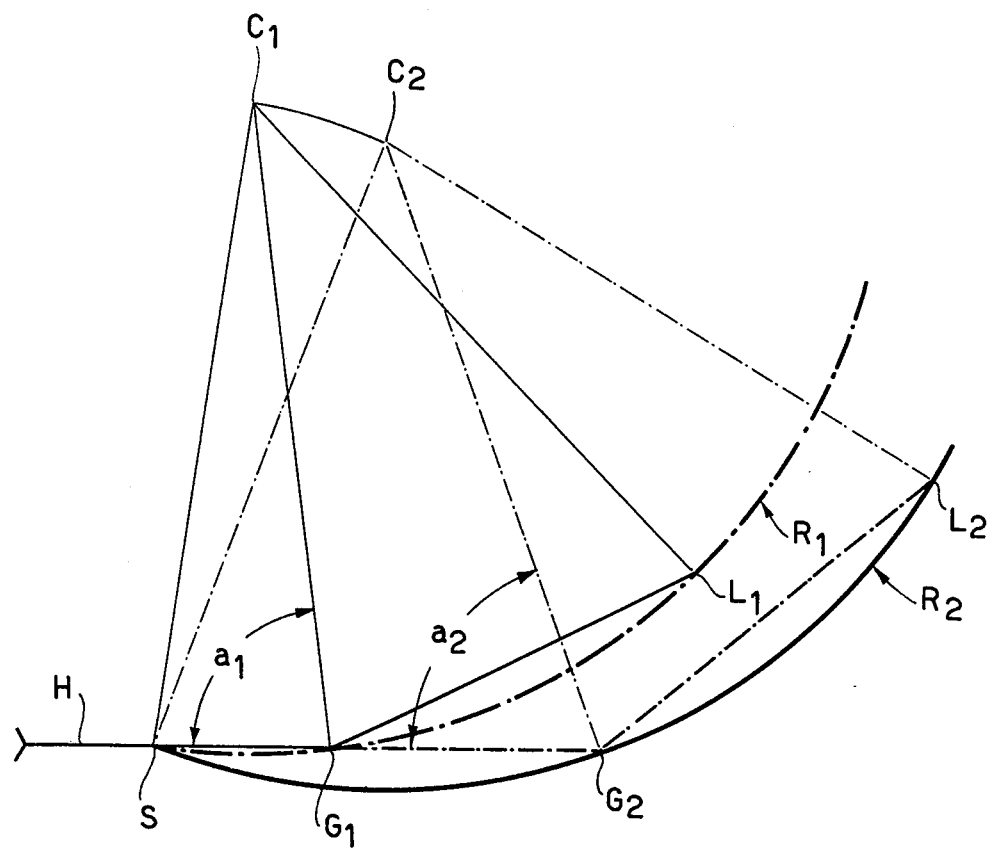
FIG. 7 is a graphical representation of the method of varying the angle of incidence in an instrument such as that shown in the preceding figures.

When in operation, before creating the vacuum between the plate 1 and cover 2, the diffraction grating 17 and photographic plate 18 are located on the curved guide 22, itself disposed in a determined angular position, so that the spectral radiation band passed by the inlet slit 16 strikes the grating 17 at an angle of incidence which exceeds the previously said critical value, and then strikes the photographic plate 18 so as to simultaneously record the intensities of all the monochromatic components lying within said spectral band. This will be more evident by considering by way of example the conditions shown diagrammatically by the full line in FIG. 7, in which $R_1$ indicates the Rowland circle with centre $C_1$, H indicates the entering radiation, S the fixed position of the inlet slit 16, $G_1$ the variable position of the grating 17, $a_1$ the angle of incidence with the grating in position $G_1$, and $L_1$ the corresponding position of the photographic detector plate 18.

In order to vary the angle of incidence, the position of the grating 17 and photographic plate 18 are varied along the Rowland circle R, i.e. the frame 25 and plate support box 29 are moved along the curved guide 22, and at the same time the angular position of this latter, and thus of the Rowland circle, is changed to give the new required angle of incidence. For example, by displacing the Rowland circle from $R_1$ with its centre $C_1$ to $R_2$ with its centre $C_2$, the grating 17 from $G_1$ to $G_2$ and the plate 18 from $L_1$ to $L_2$, the angle of incidence is changed from $a_1$ to $a_2$, to finally pass into the condition shown by the dashed and dotted line in FIG. 7. By suitable combinations of displacements of the grating 17 and photographic plate 18 along the guide 22, and angular displacements of this latter about its pivoting axis, it is thus possible to continuously vary the angle of incidence, while the inlet slit remains fixed and the correct alignment of the grating 17 and plate 18 on the Rowland circle is ensured at all times by their engagement with the guide 22.

Figure 5:
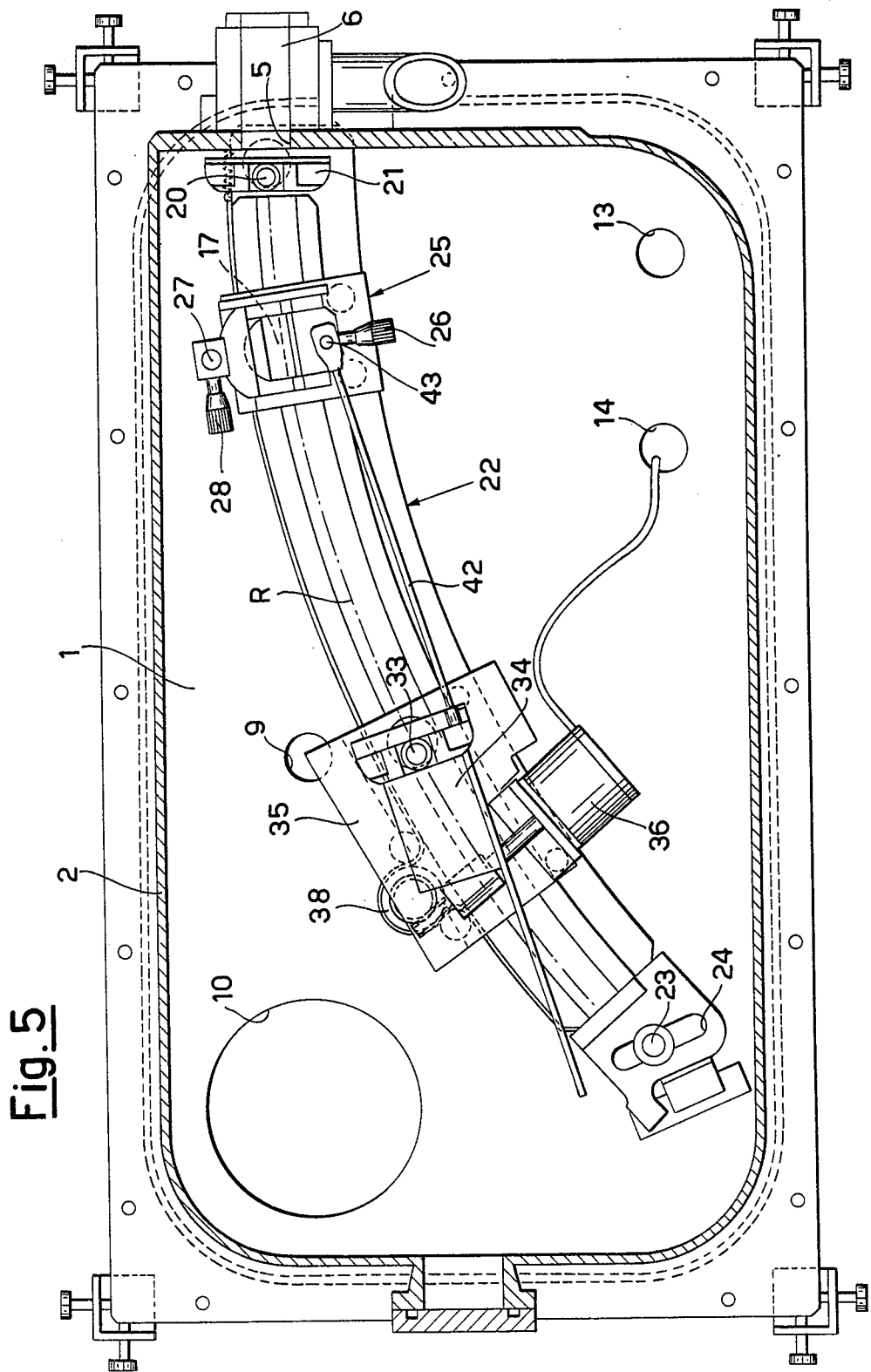
FIG. 5 is a plan view from above of the upper part of the instrument, when the instrument is used as a monochromator.
Figure 6:
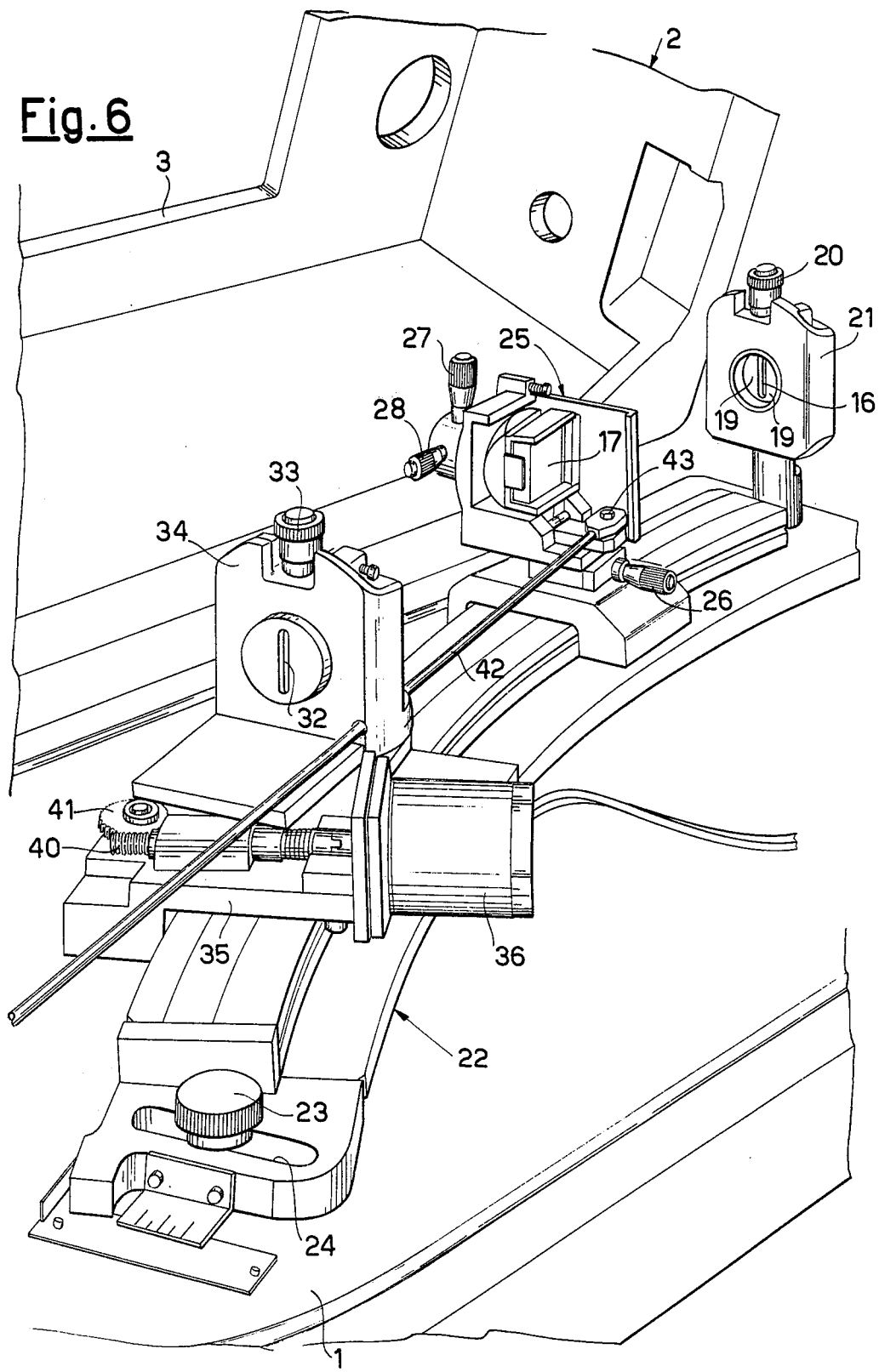
FIG. 6 is a perspective view, with the cover raised, of the optical assembly for operation as a monochromator.

As shown in FIGS. 5 and 6, the same instrument can be used as a monochromator, it being necessary only to use an outlet slit 32 as the detector means instead of the photographic plate 18. This outlet slit, the width of which can be adjusted by means of the knob 33, is provided in the vertical part of a L element 34, the horizontal part of which acts as a support plane for means which use the monochromatic radiation selected by the outlet slit 32. Said L element is rotatably supported by a carriage 35, which is displaceable along the curved guide 22 by means of an electric stepping motor 36.

Because each position of the outlet slit 32 on the focal plane, relative to the grating 17, corresponds to a different wavelength of the analysed monochromatic radiation, considerable accuracy is necessary in positioning the outlet slit 32 along the guide 22. It is also necessary for the position of said slit to be always known exactly from the outside of the instrument. Because of this, the instrument shown in FIGS. 5 and 6 is provided with a new positioning device which includes basically a steel belt 37 placed under tension between one end and the other of the guide 22 (within the space under vacuum), and a pulley 38 rotatably supported by the carriage 35 and cooperating with said belt, together with idle rollers 39 (FIG. 5). A transmission constituted by a worm 40 and gear wheel 41 enables the pulley 38 to be driven by the motor 36. The revolutions of the drive pulley 38 are thus linearly related to the distances measured on the circular development of the guide 22, so that the position of the carriage 35 relative to the centre of the grating 17 can be directly correlated to the wavelength of the radiation examined. As the position of the carriage depends on the number of steps which the motor 36 makes, the position of the carriage 35 can be determined with complete accuracy by counting the steps made by this motor by any electronic system disposed outside the instrument.

A further essential requirement for the correct operation of the instrument as a monochromator is that the plane of the outlet slit 32 is always perpendicular to the beam diffracted by the grating 17. For this purpose a rod 42 is provided, pivoted at 43 on the grating support 25 and freely slidable in a through bore in the vertical part of the L element 35. The problem is thus solved by a very simple system which at the same time is practical and effective.

When used as a monochromator, the advantages offered by the fact that the entire optical system is positioned on a single curved guide representing a portion of a Rowland circle are again apparent. Again, suitable displacements of the grating 17 and outlet slit 32 along the guide 22, combined with suitable angular displacements of the guide 22, enable the angle of incidence of the inlet radiation to be varied infinitely as required. Furthermore, by varying the position of the outlet slit 32 relative to the grating 17, it is possible to variably select one or other of the various monochromatic components of the diffracted radiation.

When changing over from a spectrograph to a monochromator, the plate holder 29 can be moved to the end of the guide relative to FIG. 3, or be extracted through the opening 3, the carriage 35 with its outlet slit 32 then being inserted in its place. For changing over in the reverse direction, the carriage 35 is extracted and the plate holder 29 is inserted in its place. In all cases, correct alignment of the detector is again obtained on its re-engagement with the guide 22.

What we claim is:

1. A spectrograph-monochromator of grazing incidence type, particularly for soft X-ray and ultraviolet radiation, comprising a base plate and an openable upper cover which define a closed space having vacuum forming means associated thereto, a stationary inlet slit housed in said closed space, a curved guide formed as a portion of a Rowland circle and connected to said base plate through a pivot coaxial with said inlet slit, and a reflecting diffraction grating and a detector which are slidingly mounted on said curved guide and are independently displaceable along the same.

2. A spectrograph-monochromator as claimed in claim 1, wherein said inlet slit is adjustable.

3. A spectrograph-monochromator as claimed in claim 1, wherein said detector comprises a photographic plate for spectrographic recording.

4. A spectrograph-monochromator as claimed in claim 1, wherein said detector comprises an outlet slit for selecting a single monochromatic component.

5. A spectrograph-monochromator as claimed in claim 4, wherein said outlet slit is adjustable.

6. A spectrograph-monochromator as claimed in claim 1, wherein said outlet slit is provided with a wall element rotatably supported by a carriage which is displaceable along said guide, said wall element being slidably traversed by a rod freely pivoted on a support frame for the grating, in such a manner that the plane of the outlet slit is always perpendicular to the direction of the diffracted radiation.

7. A spectrograph-monochromator as claimed in claim 6, comprising means, controllable from the outside, for making precise predetermined displacements of said carriage supporting the outlet slit, said means comprising a belt stretched along said guide and a pulley supported rotatably by said carriage and driven by an electric stepping motor supported by said carriage.

* * * * *

UNITED STATES PATENT AND TRADEMARK OFFICE
CERTIFICATE OF CORRECTION

PATENT NO. : 4,254,335
DATED : March 3, 1981
INVENTOR(S) : Giuseppe Tondello and Andrea M. Malvezzi It is certified that error appears in the above—identified patent and that said Letters Patent is hereby corrected as shown below:

Title Page [73] Assignee should read as follows:

[73] Assignee: C.I.S.E. Centro Informazioni Studi e Esperienze S.p.A., Italy, and C.N.R. Consiglio Nazionale della Ricerche, Italy Signed and Sealed this Seventh Day of July 1981

[SEAL]

Attest:

RENE D. TEGTMEYER

Attesting Officer

Acting Commissioner of Patents and Trademarks